(12) United States Patent
Larsson

(10) Patent No.: US 10,807,023 B2
(45) Date of Patent: Oct. 20, 2020

(54) METHOD FOR THE TREATMENT OF WATER AND WASTEWATER

(71) Applicant: Nordic Water Products AB, Västra Frölunda (SE)

(72) Inventor: Hans F. Larsson, Stockholm (SE)

(73) Assignee: Nordic Water Products AB, Västra Frölunda (SE)

( * ) Notice: Subject to any disclaimer, the term of this patent is extended or adjusted under 35 U.S.C. 154(b) by 730 days.

(21) Appl. No.: 14/274,256

(22) Filed: May 9, 2014

(65) Prior Publication Data

US 2014/0246388 A1 Sep. 4, 2014

Related U.S. Application Data

(62) Division of application No. 13/509,014, filed as application No. PCT/EP2009/065011 on Nov. 11, 2009, now abandoned.

(51) Int. Cl.
*B01D 24/46* (2006.01)
*B01D 24/00* (2006.01)
*B01D 24/30* (2006.01)

(52) U.S. Cl.
CPC .......... *B01D 24/46* (2013.01); *B01D 24/007* (2013.01); *B01D 24/30* (2013.01); *B01D 24/4689* (2013.01)

(58) Field of Classification Search
None
See application file for complete search history.

(56) References Cited

U.S. PATENT DOCUMENTS

| 1,620,431 | A | * | 3/1927 | Bramwell | B01D 24/002 |
| | | | | | 210/189 |
| 1,861,295 | A | | 5/1932 | Balfour | |
| 2,352,901 | A | * | 7/1944 | Klein | C02F 1/645 |
| | | | | | 210/120 |
| 3,667,604 | A | * | 6/1972 | Lagoutte | B01D 24/30 |
| | | | | | 210/136 |
| 3,680,701 | A | * | 8/1972 | Holca | B01D 24/4631 |
| | | | | | 210/790 |
| 3,998,739 | A | * | 12/1976 | Morimoto | B01D 24/08 |
| | | | | | 210/189 |
| 4,008,159 | A | * | 2/1977 | Besik | C02F 3/04 |
| | | | | | 210/601 |

(Continued)

FOREIGN PATENT DOCUMENTS

| DE | 26 30 195 A1 | 1/1978 |
| FR | 2 509 994 A1 | 1/1983 |

(Continued)

*Primary Examiner* — Robert J Popovics
(74) *Attorney, Agent, or Firm* — Blank Rome LLP

(57) ABSTRACT

A method and a plant for the treatment of water or wastewater having impurities by filtration of the water through two granular media filter stages of the moving bed type operated in series. The method includes the steps of feeding the water/wastewater as a first influent to first stage granular media filters; filtration of the first influent in the first stage granular media filters to produce a first effluent; feeding the first effluent as a second influent to second stage granular media filters; and filtration of the second influent in the second stage granular media filters to produce a second effluent. The second stage granular media filters are operated with intermittent washing of the granular filter media.

13 Claims, 6 Drawing Sheets

(56) References Cited

U.S. PATENT DOCUMENTS

| | | | | |
|---|---|---|---|---|
| 4,048,068 | A | 9/1977 | Hirs | |
| 4,126,546 | A * | 11/1978 | Hjelmner | B01D 24/16 210/741 |
| 4,197,201 | A * | 4/1980 | Hjelmner | B01D 24/002 210/189 |
| 4,246,102 | A | 1/1981 | Hjelmner et al. | |
| 4,787,987 | A * | 11/1988 | Hensley | B01D 24/12 210/269 |
| 4,966,698 | A * | 10/1990 | Hensley | B01D 36/001 210/269 |
| 5,080,779 | A * | 1/1992 | Awbrey | C10G 17/02 208/251 R |
| 5,112,504 | A * | 5/1992 | Johnson | B01D 24/30 210/792 |
| 5,454,959 | A | 10/1995 | Stevens | |
| 5,462,654 | A * | 10/1995 | Hering, Jr. | B01D 24/30 210/189 |
| 5,520,804 | A * | 5/1996 | Ward | B01D 24/004 210/189 |
| 5,543,037 | A * | 8/1996 | Hering, Jr. | B01D 24/30 210/104 |
| 5,635,080 | A * | 6/1997 | Hensley | B01D 24/12 210/792 |
| 5,843,308 | A * | 12/1998 | Suozzo | B01D 24/30 210/195.1 |
| 6,039,866 | A * | 3/2000 | Tanaka | B01D 24/007 210/136 |
| 6,319,396 | B1 | 11/2001 | Heagey | |
| 6,319,400 | B1 * | 11/2001 | Hirs | B01D 24/007 210/275 |
| 6,423,216 | B1 * | 7/2002 | Yum | C02F 3/006 210/150 |
| 6,426,005 | B1 * | 7/2002 | Larsson | B01D 24/007 210/650 |
| 6,641,737 | B2 * | 11/2003 | Xia | B01D 24/30 210/676 |
| 6,790,351 | B2 * | 9/2004 | Xia | B01D 24/30 210/189 |
| 7,022,233 | B2 * | 4/2006 | Chen | C02F 3/302 210/151 |
| 7,204,930 | B2 * | 4/2007 | Nightingale | C02F 1/74 210/104 |
| 7,270,745 | B2 * | 9/2007 | Schwartzkopf | B01D 21/0012 210/108 |
| 7,381,336 | B2 * | 6/2008 | Stedman | B01D 24/4689 210/741 |
| 7,553,418 | B2 * | 6/2009 | Khudenko | C02F 1/004 210/601 |
| 7,666,302 | B2 * | 2/2010 | Jenkins | C02F 3/302 210/150 |
| 8,012,359 | B2 * | 9/2011 | Parkinson | B01D 24/008 210/786 |
| 8,017,018 | B2 * | 9/2011 | Lawrence | C02F 1/004 210/666 |
| 8,101,072 | B2 * | 1/2012 | Lawrence | C02F 1/5245 210/195.3 |
| 8,110,116 | B2 * | 2/2012 | Mimura | B01D 24/10 210/792 |
| 8,152,998 | B2 * | 4/2012 | Xia | B01D 24/4689 210/189 |
| 8,246,818 | B2 * | 8/2012 | Korzeniowski | B01D 24/008 210/86 |
| 8,771,521 | B2 * | 7/2014 | Boyd | B01D 24/14 210/108 |
| 9,358,480 | B2 * | 6/2016 | Cordua | B01D 24/007 |
| 9,409,103 | B2 * | 8/2016 | Saito | B01D 41/02 |
| 10,017,406 | B2 * | 7/2018 | Reid | C02F 3/107 |
| 10,160,678 | B2 * | 12/2018 | Reid | C02F 3/1221 |
| 10,526,225 | B1 * | 1/2020 | Moya | B01D 29/27 |
| 2005/0077247 | A1 | 4/2005 | Stedman | |
| 2008/0302724 | A1 * | 12/2008 | Boyd | B01D 24/167 210/650 |
| 2009/0045135 | A1 * | 2/2009 | Khudenko | C02F 1/004 210/631 |
| 2011/0168641 | A1 * | 7/2011 | Boyd | B01D 24/14 210/741 |
| 2012/0261357 | A1 * | 10/2012 | Larsson | B01D 24/007 210/786 |
| 2014/0246388 | A1 * | 9/2014 | Larsson | B01D 24/007 210/792 |
| 2015/0090659 | A1 * | 4/2015 | Reid | C02F 3/107 210/607 |
| 2016/0332901 | A1 * | 11/2016 | Matsui | C02F 3/006 |
| 2017/0240446 | A1 * | 8/2017 | Reid | C02F 3/1215 |
| 2018/0169546 | A1 * | 6/2018 | Faber | B01D 24/26 |

FOREIGN PATENT DOCUMENTS

| | | |
|---|---|---|
| JP | H03-296404 A | 12/1991 |
| JP | H06-55008 A | 3/1994 |
| WO | WO 98/19766 A1 | 5/1998 |
| WO | WO 01/79117 A2 | 10/2001 |

* cited by examiner

METHOD FOR THE TREATMENT OF WATER AND WASTEWATER

This is a divisional of application Ser. No. 13/509,014, filed Jun. 28, 2012, which is a 371 of PCT/EP2009/065011, filed Nov. 11, 2009.

FIELD OF THE INVENTION

The present invention relates to the treatment of water/wastewater, and more particularly, to an improved method for removing impurities/pollutants, for example particles, precipitates, metals, emulsions, algae, bacteria, viruses, Protozoa and their oocysts as well as other microorganisms and related matter from water/wastewater according to the preamble of claim 1.

BACKGROUND OF THE INVENTION

Water normally needs to be purified before it is used by municipalities and/or industries, and the wastewater produced by municipalities and/or industries needs to be treated before it is reused and/or discharged. The quality demands for the treated water/wastewater have got stricter over time due to stricter drinking water and environmental regulations. The need to use new sources for drinking water and process water like seawater and/or polluted surface water and/or treated wastewater further creates a need for advanced and reliable treatment methods and/or systems to produce acceptable water.

New methods and systems are needed both for complete stand alone systems as well as for specific treatment steps in a chain of treatment steps, for example pre-treatment before membranes for seawater desalination.

Another such system may be a water treatment system where drinking water or industrial process water is produced from seawater and/or surface water and another system may be a wastewater treatment system, wherein the wastewater needs to be treated so that it can be discharged or reused in industry or in municipalities or for irrigation, as a part source of drinking water and similar purposes. A further example is the treatment of lake and/or river water and/or ground water to produce drinking water and/or process water.

Such methods and systems should be simple, reliable and produce treated water of a very high quality. Such treatment systems and/or steps should further be energy efficient and use as little chemicals as possible and produce as little reject and/or polluting by-products of the treatment as possible.

In order for such treated water as mentioned in the examples to be useful, particles, dissolved substances, algae, bacteria, viruses, Protozoa, organic substances, phosphorus and other nutrients, arsenic, metals and other pollutants may in many cases need to be removed to a very high degree from the water/wastewater. Moreover microorganisms, such as *Cryptosporidium* and *Giardia* and their oocysts and/or cysts, may need to be removed from the water/wastewater. Many systems have one or more steps that convert dissolved or colloidal matter to particles that can be separated by solids/liquid separation techniques. In such a purification process and/or as a treatment step in such a purification process, the water/wastewater may be subjected to precipitation and/or flocculation treatment. Dissolved substances such as humic substances, metals, nutrients e.g. phosphorus and/or poisonous substances like arsenic and its compounds, fluorides and/or pesticides are converted to solid particles and/or absorbed or adsorbed on solid particles. Such particles may be of colloidal size and/or created by precipitation and may need to be flocculated in order to create bigger particles. Colloidal matter and other fine particles present in the water/wastewater may also need to be subjected to precipitation and/or flocculation treatment in order to create bigger particles.

In this regard, conventional chemical treatment can include chemical injection and flash mixing/precipitation followed by one or more flocculation tanks in which the water/wastewater is agitated with stirrers or agitators in order to create bigger particles, flocs after which it passes through one or more sedimentation basins for separation of particles and/or flocs. One of the disadvantages of conventional chemical treatment processes is the large area and/or volume required for the flocculation tanks and sedimentation basins. A further disadvantage of conventional chemical treatment techniques is the long residence time for the water/wastewater in the flocculation tank as well as in the sedimentation basin.

The use of chemicals addition, flocculation tanks and sedimentation basins alone in the chemical treatment process does not typically result in a high enough water purity for many applications. While membrane filtration with a suitably tight membrane can be used to attain a higher level of purification, such membrane filters are expensive and have other disadvantages. On the other hand, a granular media filter, for example a sand filter, can be added in the treatment chain to increase the purity of the water being treated. The granular filter media in such granular bed filters must be cleaned. In some such filters the granular filter media is cleaned by being subjected to back-washing at intervals and/or when the pressure drop over the filter bed has reached a predetermined level. This means that the filtration has to be shut off while the granular bed filter is backwashed. Further, during a period of time after back-washing such granular bed filters produce a first filtrate which is of low quality and has to be discharged when high quality water is to be produced. The reason for the low quality of the first filtrate is that after back-washing the granular filter bed is clean and free from separated solids. However, such separated solids assist the separation in the filter bed and therefore their absence leads to low filtrate quality. Great savings may be obtained if a continuously operated granular bed filter of the moving bed type is used. The most common type of granular filter media used is filter sand. Such filters are described in U.S. Pat. No. 6,426,005 B1, U.S. Pat. Nos. 4,126,546, 4,197,201 and 4,246,102, as well as in U.S. Pat. No. 5,843,308. The filters described in these patent documents are of the moving filter bed type.

In such a filter chemicals may be added to the influent to the filter and precipitation, flocculation and separation can all take place in the filter bed as described in U.S. Pat. No. 4,246,102 and in U.S. Pat. No. 6,426,005 B1. A further advantage is that the continuous granular bed filter will not have to be taken out of operation for backwashing and thus there will not be a need for extra capacity to take care of the flow that should have been treated in the conventional filters in a conventional plant being backwashed. There will be no first filtrate in a continuous sand filter since the continuous washing is arranged so that part of the granular media is continuously taken out of the filter bed, washed and returned to the filter bed, so that a steady state is reached where a suitable amount of separated particles is always left in the granular filter bed. Continuous sand filters are well known today and there are many plants having continuous sand filters working as a purification step in water treatment systems for municipal and industrial water and wastewater.

The continuous sand filters generally work well but as mentioned above there are applications were really high purity of the treated water is required and where e.g. membrane treatment would be required. Membrane plants are however expensive, sensitive and costly to run due to high energy demand and the necessity to exchange the membranes at regular intervals. Furthermore the cleaning of the membranes normally produces large quantities of reject water and in many cases poisonous chemicals are needed for the cleaning of the membranes. Therefore, there is a need for more economical treatment systems that are simpler, more robust and more energy efficient and produce less reject or wash water but still produce a very high quality filtrate as the effluent.

An example of such a systems is e.g. disclosed in U.S. Pat. No. 6,426,005 B1 relating to a method and system for treating water/wastewater including two serial, continuously operating granular media filters of the moving bed type with continuos washing of the granular bed media, e.g. moving bed sand filters. The type of system disclosed in U.S. Pat. No. 6,426,005 B1 can either be used as a stand alone system for treatment of water and/or wastewater or be used as a part of a treatment system consisting of a number of steps.

The treatment system according to U.S. Pat. No. 6,426,005 B1 thus comprises two serial continuously operating granular media filters of the moving bed type that may have different size of filter media, e.g. filter sand. In addition, chemicals for coagulation/flocculation may be added and the liquid to be treated may be subjected to a disinfecting treatment and/or a mechanical, biological and/or chemical treatment. The water/wastewater to be treated is introduced as an influent into said filters. The water/wastewater is treated within said filters such that treated, processed water/wastewater or effluent is produced and the impurities separated in the bed in the first granular media filter are discharged from the first granular media filter as a first reject. The effluent from the first granular media filter is further filtered in the second continuously operating granular media filter such that the effluent from the second granular media filter is the filtrate and the impurities separated in the bed in the second granular media filter are discharged from the second granular media filter as a second reject. In order to further concentrate the pollutants in the first and second rejects, the first and second rejects being discharged from the first and second continuously operated granular media filters, respectively, are introduced into a separate treatment apparatus. In such a treatment apparatus, the rejects containing pollutants separated from the water/wastewater being treated in the first and second serial granular media filters are subjected to a renewed treatment and/or separate treatment that eventually results in purified water that meets quality standards and a sludge that can be dewatered and/or processed, as its end products.

However, although this system works very well, and high quality water can be produced with it, there is still a need to produce even cleaner treated water or effluent. For example such a system cannot from many sources of seawater and/or water from common sweet water sources for drinking water/process water consistently produce water having a purity measured as SDI (Silt Density Index) 4 or lower. Considering that the usual requirement for a pre-treatment step upstream of a reverse osmosis membrane (R/O) is that the SDI value should at all times be equal to or lower than SDI=4 it is of the utmost importance to be able to fulfil this requirement in an economical and efficient way.

Pure water is a limited resource in the world, while at the same time sea water is an immense resource for drinking water. Both these factors have influenced companies and inventors to develop methods and means for water purification and techniques for desalination of sea water. One technique for doing this is reverse osmosis.

Reverse osmosis which uses membranes that are both expensive and very sensitive is a realistic technique for desalination of sea water, but it is essential that the influent to a reverse osmosis plant is substantially free from particulate matter and other pollutants, or expressed in other terms, has a silt density index SDI, which does not exceed SDI 4, and preferably is even lower. It is not possible to consistently reach this high purity level when treating feed water with a substantial variation in the level of pollutants with existing techniques using granular media filters, and as mentioned above with the advanced system according to U.S. Pat. No. 6,426,005 B1, only under favourable circumstances is it possible to obtain an SDI of around 5 or lower.

In the treatment of municipal wastewater a far reaching reduction of nutrients is required in order to prevent eutrophication of rivers and lakes. Some municipalities demand a level of total phosphorus of 0.02 milligrams per litre or lower. This is normally not possible to consistently achieve by the use of conventional granular bed filters with chemical treatment and even with a system such as that described in U.S. Pat. No. 6,426,005 B1. Consequently improved systems that are reliable and cost efficient and that can achieve this effluent quality are highly desirable.

In other applications bacteria, viruses and/or microorganisms like *Giardia* and *Cryptosporidium* and their oocysts need to be removed to the highest degree. Also here improved systems are highly desirable.

Arsenic in drinking water sources presents another example where high efficiency separation in a simple, robust, and reliable system is much needed.

Ground water may contain particles, metals and/or dissolved substances that may need to be removed to a high degree.

The examples just represent a few cases of many such applications where a very high degree of purification is needed and where the method and system should be cost effective, simple to operate and reliable.

SUMMARY OF THE INVENTION

One object of the present invention is to provide an improved method for the treatment of water and/or wastewater which is suitable for all applications where particles and/or other pollutants and/or emulsions are to be separated to a very high degree in order to produce a very clean effluent.

Another object of the invention is to provide an improved method for the treatment of seawater and/or other salt containing water that makes it possible to consistently produce water which is sufficiently pure (SDI consistently below 4) to be treated in a desalination plant working with reverse osmosis membranes, and at the same time provide a robust system being able to cope with comparatively low quality influents with characteristics that may vary strongly due to circumstances, e.g. storms leading to sharply increased silt levels, algal growth, construction and/or shipping activity near the seawater intake.

Another object of the invention is to provide an improved method for production from surface water, ground water and/or wastewater of drinking water and/or industrial process water that must be of a high quality like e.g. boiler feed water. In such treatment particles, humic substances, microorganisms, viruses, arsenic, metals, fluorides, pesticides and a number of other substances may have to be removed.

Another object of the invention is to provide an improved method for removing particles from water that has been subjected to precipitation down to very low levels of pollutants, e.g. 0.02 mg/l or lower for total phosphorus. Other examples where a very high separation efficiency after precipitation can be obtained is for the removal of arsenic, metals and/or fluorides from water as well as the removal of *Giardia* and *Cryptosporidium* and their cysts and oocysts as well as other microorganisms. The mentioned applications are just examples and the method and system of the invention is suitable in all cases where a very clean water is to be produced from water and/or wastewater containing impurities and where the impurities are in particle form and/or can be transformed into particle form and/or may be adsorbed or absorbed on activated granular carbon and/or other adsorbents/absorbents and/or granular media coated with adsorbents and/or absorbents and/or reacted with the help of granular catalyst particles and/or granular media coated with catalysts and/or other reactants.

A further object of the present invention is to provide a system or plant for the treatment of water which consumes less energy and produces less reject to be taken care of compared with prior art processes.

Another object of the invention is to provide a system or plant that uses less chemicals to obtain the desired high purity of the effluent.

These and other objects of the invention will be achieved with the method according to claim 1 with the features defined in the characterizing part, and the plant according to claim 14. Developments and preferred embodiments of the invention are defined in the sub claims.

The improved method according to the invention for the treatment of water or wastewater, having impurities therein, uses two granular media filter stages of the moving bed type, operated in series. Intermittent washing of the granular filter media in the second or downstream granular media filter stage according to the invention, very surprisingly produces a substantial improvement of the effluent when used on the same influent and the under the same conditions as for the system according to U.S. Pat. No. 6,425,005 B1. For instance, when treating sea water as a pre-treatment for reverse osmosis the effluent resulting from the method and system according to the invention had a SDI of 4 or lower with chemical addition, while the prior art system operated on the same type of water and under equal conditions but with continuous washing of the second stage granular filter media bed produced an effluent with an SDI of approximately 5.

Even more surprising, after optimising the filtration system and/or plant according to the invention and using bigger filters a treated water of around SDI 3 was obtained without chemical addition. Since the cost of chemicals constitutes a big part of the cost of operation this leads to a major cost saving. In addition to the improved effluent quality and the savings related to the cost of chemicals the intermittent washing operation in the second stage granular media filter led to a much lower energy consumption and a much lower production of reject water.

According to one embodiment of the invention, granular media filters in the second stage are operated with continuous filtration.

According to another embodiment of the invention, the second stage granular media filters are operated with intermittent filtration and intermittent washing, i.e. the filtration is stopped during the intermittent washing, and water used for washing of the filter media is replaced with suitably clean water.

According to a further embodiment of the invention the first stage granular media filters are operated with continuous filtration and continuous granular media washing.

According to a further embodiment of the invention the first stage granular media filters are operated with continuous filtration but with intermittent granular media washing.

According to a further embodiment of the invention the first stage granular media filters are operated with intermittent filtration and intermittent washing, i.e. the filtration is stopped during the intermittent washing, and water used for washing of the filter media is replaced with suitably clean water.

According to a further embodiment of the invention, during intermittent filtration water used for washing of the filter media is replaced with suitably clean water, preferably effluent from a parallel filter being in filtration mode.

According to a further embodiment of the invention, each of said first and second stage granular media filters are washed by removing granular filter media from the bottom part of the filter bed, transporting it to a media washer, washing it and returning it to the top of the filter bed, while a reject consisting of wash water and pollutants is produced.

According to a further embodiment of the invention granular filter media is transported from the bottom part of the filter bed with an air lift pump to a media washer, the washed filter media is returned to the top of the filter bed and the reject produced consisting of wash water and pollutants is discharged through a reject pipe.

According to a further embodiment of the invention a valve in the reject pipe is kept open only during the washing of filter media.

According to a further embodiment of the invention the valve in the reject pipe is opened at a suitable time before starting the air lift pump and is closed at a suitable time after the air lift pump is stopped.

According to a further embodiment of the invention a continuous fractional flow of water through the reject pipe is maintained between washings.

According to a further embodiment of the invention, coarser granular media is used in said first stage granular media filters in relation to in said second stage granular media filters. Further, different densities of the granular media can be used in the first and second stage granular media filters, respectively.

According to a further embodiment of the invention, said first stage granular media filters are arranged with their effluent pipes at a higher level above ground in relation to the influent pipes of said second stage granular media filters.

According to a further embodiment of the invention a shorter filter bed is used in the second stage filters.

According to a further embodiment of the invention the rejects from the first and second filter stages are either discharged or subjected to further treatment and/or disinfection in order to concentrate and/or make harmless the rejects, or they are returned to an earlier step in the treatment chain. The reject from the second filter stage may as an alternative be returned to the influent of the first stage granular media filters.

BRIEF DESCRIPTION OF THE DRAWINGS

The invention will now be described more in detail in the following description with reference to the accompanying drawings, of which FIG. 1 schematically illustrates a two stage filtering system with granular media filter modules of the moving bed type for performing the method according to the invention, where each of the first and second stages consist either of any number of free-standing granular media filter modules operated in parallel (in case of more than one filter) or consist of a number of granular media filter modules arranged in filter cells, in which case a filter plant will comprise an arbitrary number of cells in each filter stage being arranged to work in parallel with each other (in case of more than one cell).

FIG. 4b is a cross-sectional view taken along the line IVb-IVb in FIG. 4a.

FIG. 4c is a cross-sectional view taken along the line IVc-IVc in FIG. 4a.

DETAILED DESCRIPTION OF THE INVENTION

Figure 5:
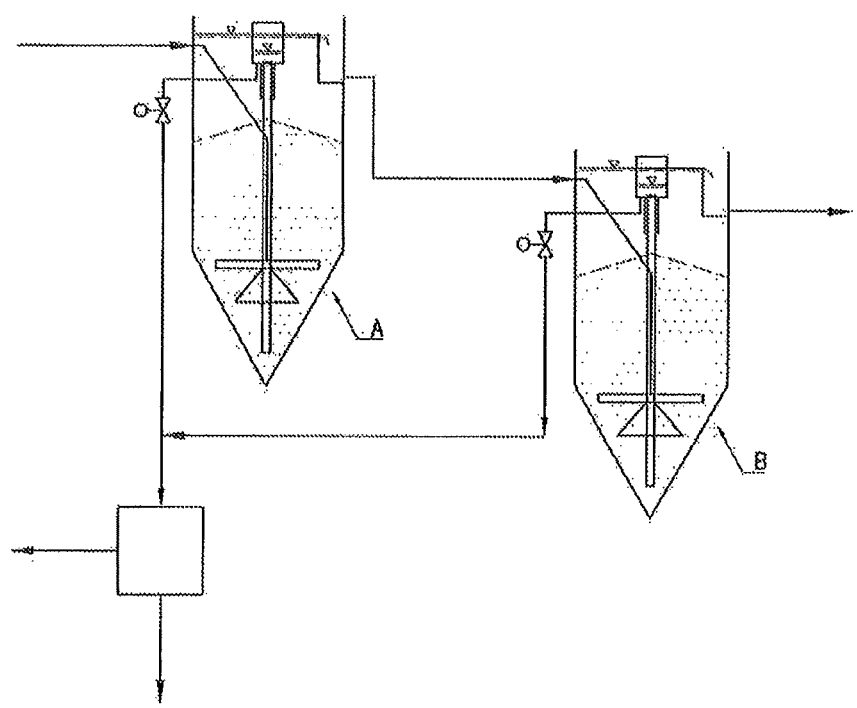
FIG. 5 illustrates a prior art water/wastewater treatment apparatus including two serial, continuously operated sand filters with continuous filtration and continuous washing of the granular filter bed media.

The prior art filter system according to U.S. Pat. No. 6,426,005 B1 is schematically illustrated in FIG. 5 of the drawings. The working principle is exhaustively explained in the specification of said patent, which is incorporated herein by reference, in its entirety.

In the prior art process described in U.S. Pat. No. 6,426,005 B1, a first, or upstream filter A works with continuous filtration of water/wastewater fed upwards through the granular filter media, while the bed of granular filter media moves downwards. A part of the dirty granular filter media is transported with an air lift pump up to the top of the filter and is washed and returned to the top of the filter bed. In the prior art device the second or downstream filter B works according to the same principle i.e. continuous filtration and continuous, uninterrupted washing of the filter media.

Figure 1:
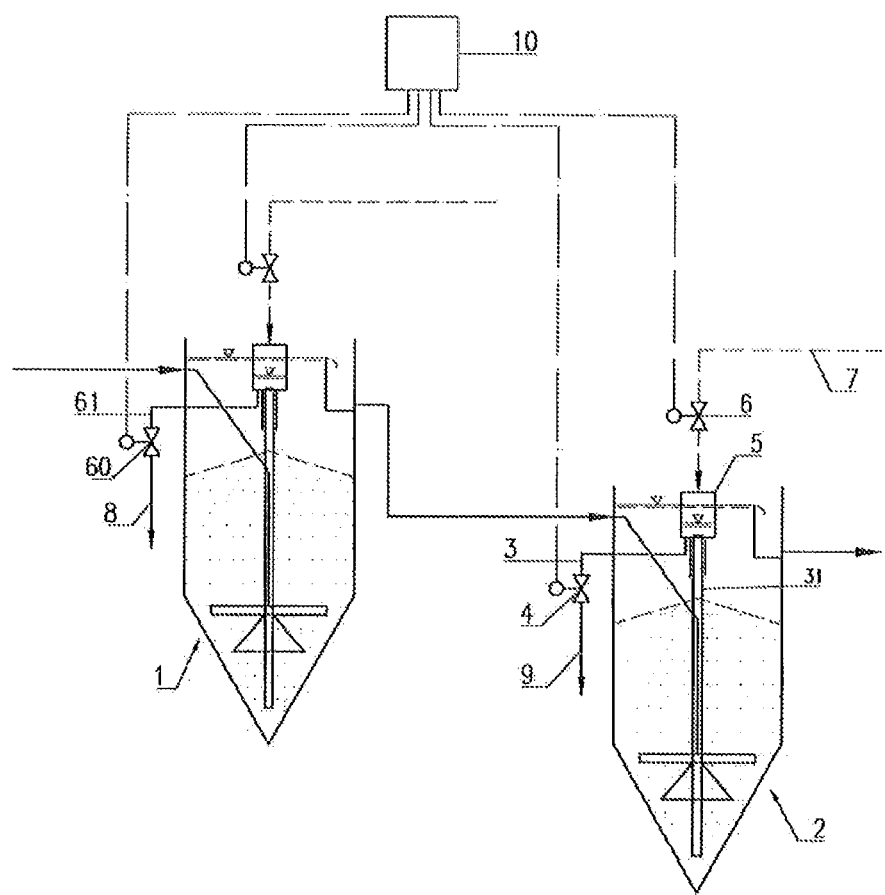

FIG. 1 illustrates a filter system for performing the method according to the invention. The system comprises a first 1 and a second 2 stage granular filter media filter of the moving bed type, corresponding to the filters disclosed in U.S. Pat. No. 6,246,005 B1.

According to the invention, the second stage granular media filter 2 is operated with intermittent washing of the granular filter media. Granular filter media is transported by an air lift pump 31 from the bottom part of the granular filter media bed to a media washer 5. The reject pipe 3 is provided with a valve 4 so that the flow of wash water through the media washer can be turned off when there is no washing and consequently no need for wash water. It is advantageous to arrange the control of this valve so that it opens a suitable time before the air lift pump is started and closes at a suitable time after the air lift pump is stopped. This is to assure that there is a flow of wash water already when the first granular media particles enter the media washer when the air lift pump is started, and so that all granular media particles in the media washer when the air lift pump is stopped will be washed. The air lift pump is provided with a control, shown as a controlled valve 6 in a pipe for compressed air 7 for turning the air flow on and off i.e. starting and stopping the pumping action of the airlift pump 31, and thus together with the valve 4 controlling the intermittent washing of the granular filter media.

By controlling the reject valve 4 and the air lift pump 31, for instance allowing two washing periods of 30 minutes each per 24 hours the consumption of pressurized air, and thus energy consumption for washing of granular filter media, in the second stage granular media filter 2 will be reduced by more than 95% and the reject volume will be reduced by a factor 20 making it much easier to take care of and/or treat.

In case the incoming water to the first stage granular media filter 1 contains a low amount of impurities then it may be advantageous to operate also the first stage granular media filter 1 with intermittent washing of the granular filter media.

The reject consisting of wash water and pollutants, discharged through reject pipe 8 from the first stage granular media filter and through reject pipe 9 from the second stage granular media filter resulting from the two stage filtration according to the invention may be taken care of according to any of the methods described in U.S. Pat. No. 6,426,005 B1, or when the two stage filtration is part of a larger treatment system it may be returned to an upstream treatment step or alternatively the reject may be discharged directly e.g. into the sea or a lake in case its composition allows this. The reject from the second stage granular media filter can also be returned to the influent to the first stage granular media filter, either directly upstream of the first stage granular media filter or upstream of or together with injection of chemicals. The process and the operation of the two granular media filter stages is controlled from a control unit 10.

Figure 2:
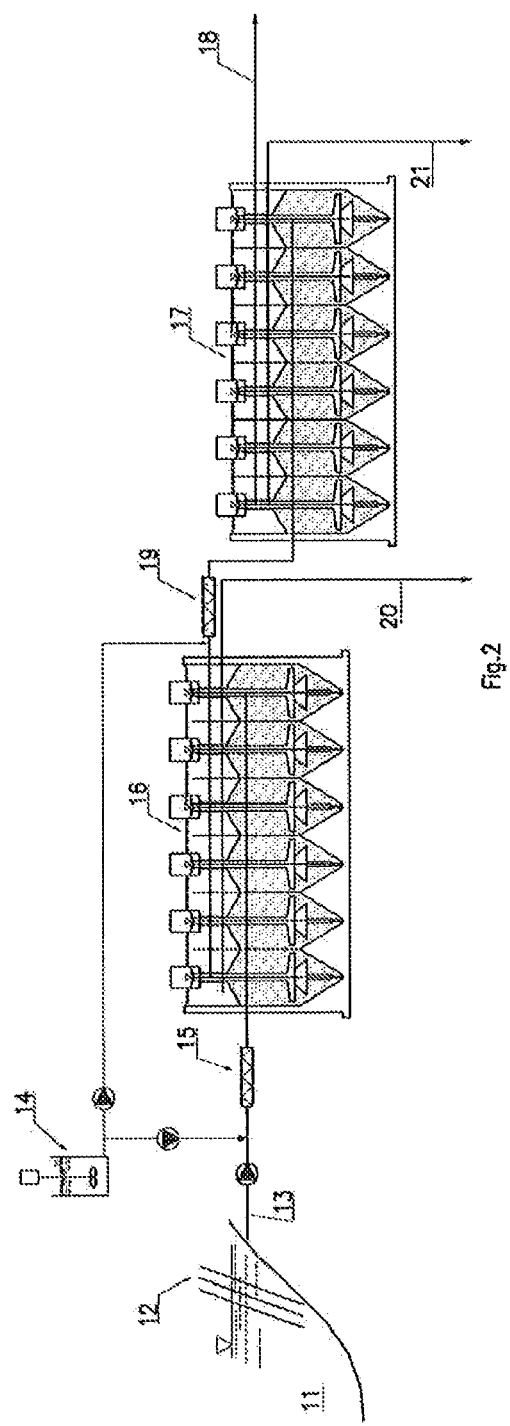
FIG. 2 schematically illustrates a system for treatment of sea water or surface water according to the invention and with optional chemical treatment.

FIG. 2 shows a large scale two stage granular media filter system arranged for a bigger plant or as part of a bigger plant with optional chemicals addition. In the illustrated example, lake, river or sea water 11 is taken into a plant through an intake screen 12, through a feed pipe 13. Chemicals can be introduced into the feed pipe 13 from a dosing apparatus 14 directly or upstream of a mixing device, such as static mixer 15 or a dynamic mixer, before the first granular media filter stage 16. When addition of chemicals is discussed with reference to static mixers in the following description, this is one example. Dynamic mixers and direct addition of chemicals can be used instead.

In case chemicals are added precipitation, flocculation and separation can be carried out in the first granular media filter stage 16 and the treated effluent from the first granular media filter stage 16 is further polished by filtration in a second granular media filter stage 17, so that remaining particles and/or flocs can be separated in order to produce a very clean effluent leaving the second granular media filter stage 17 through the pipe 18. In some cases it is advantageous to add chemicals only to the first granular media filter stage 16, e.g. via the static mixer 15, to both the first granular media filter stage 16 e.g. via the static mixer 15 and the second granular media filter stage 17, e.g. via a static mixer 19, only to the second granular media filter stage e.g. via the static mixer 19, or no chemical addition at all. In many cases where a system according to the prior art of U.S. Pat. No. 6,246,005 B1 requires the addition of chemicals, the system according to the invention can produce cleaner effluent without any addition of chemicals which leads to a great cost saving. Reject in the form of wash water containing pollutants separated from the granular filter media leaves the first granular media filter stage through the pipe 20, and from the second granular media filter stage through the pipe 21. These reject streams can be taken care of in different ways, which will be discussed further below.

Figure 3:
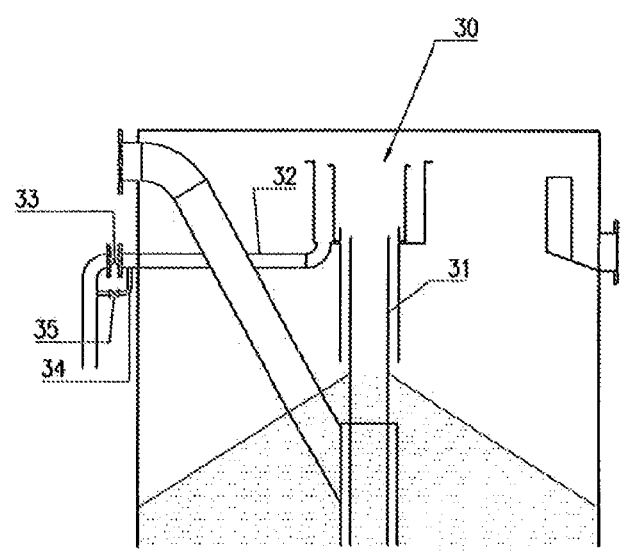
FIG. 3 schematically illustrates the discharge of reject water from the granular media washer with a reject valve and a bypass on the reject pipe.

FIG. 3 shows a media washer 30 used according to the invention for washing granular filter media taken from the bottom part of the granular filter media bed and transported with an air lift pump 31, the top of which is shown in FIG. 3. A reject pipe 32 transporting the reject from the media washer is also shown.

A valve 33, also discussed in connection with FIG. 1 with the reference numeral 4, is arranged in the reject pipe 32.

When producing extremely clean water every potential source of pollution must be eliminated. One such potential source of pollutants when operating a granular media filter of the moving bed type with intermittent filter media washing is the possibility that, between the washing periods, a small flow of water passes up through the air lift pump tube without being sufficiently filtered in the granular filter media bed and escapes into the effluent by moving downward through the filter media washer.

According to the invention such pollution is prevented by allowing a fractional flow of water to pass up through the media washer and out through the reject pipe 32 and carrying with it any pollutants that may have escaped from the air lift pump. This can be achieved with a bypass conduit 34 arranged around the valve 33. This by-pass is also provided with a shut-off valve 35. As an alternative, the valve 33 may be constituted by a valve means which does not close completely or which, when washing is not performed, may be controlled to let a fractional flow of water pass through the valve.

Figure 4A:
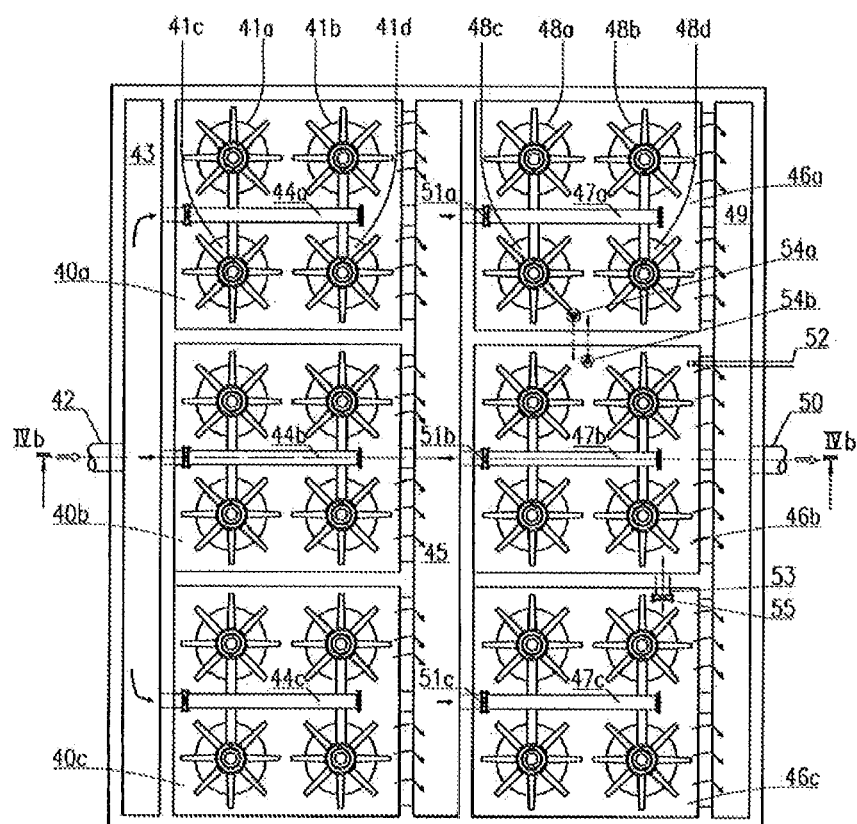
FIG. 4a schematically illustrates part of a filtration plant according to the invention.
Figure 4B:
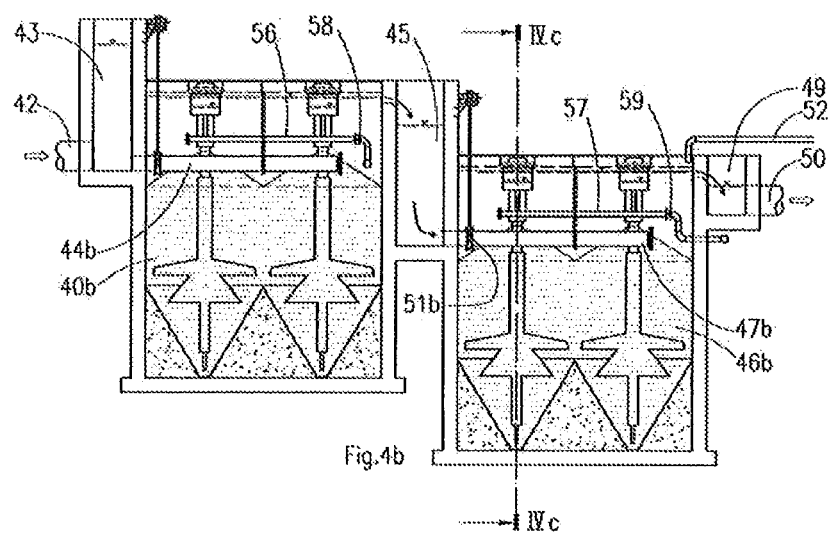
Figure 4C:
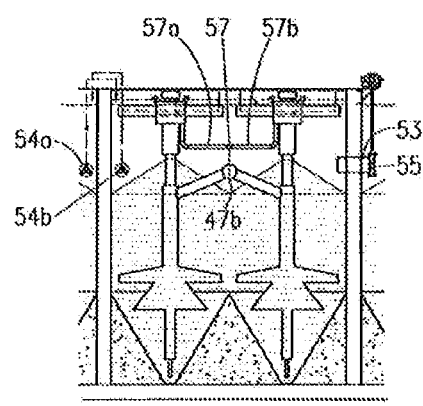

FIG. 4a shows a schematic top view, FIG. 4b shows a cross-sectional view taken along the line IVb-IVb in FIG. 4a, and FIG. 4c shows a cross-sectional view taken along the line IVc-IVc in FIG. 4b, of a plant comprising first stage granular media filters of moving bed type and second stage granular media filters of moving bed type arranged in cells each containing four granular media filter modules. The layout shown in FIG. 4a has been chosen only for the ease of understanding, and it is obvious that any number of cells can be used containing any number of granular media filter modules.

In a concrete structure three first stage filter cells 40a, b, c, each containing four granular media filter modules 41a, b, c, d are arranged. A first influent, which could be sea water, lake water, river water, ground water or water from a preceding process, enters the plant through a feed pipe 42 into a trough 43 communicating with each of the filter modules through first feed pipes 44a, b, c. A first effluent from the filter cells 40 a, b, c enters a second trough 45, which is connected to the second stage filter cells 46a, b, c through second feed pipes 47a, b, c, for supplying this first effluent from the first stage filter cells as a second influent to the second stage filter cells containing four second stage granular media filter modules 48a, b, c, d. A second effluent from these second stage filter cells enters into a third trough 49 and leaves the plant through the outgoing pipe 50.

The second feed pipes 47a, b, c are provided with valves 51a, b, c for an optional closing of the supply of second influent into the second stage filter modules, i.e. intermittent filtration in the second stage filter cells.

When producing extremely clean water (SDI around 3 or lower) every possible source of pollution of the effluent has to be avoided. In order to avoid any risk that particles enter into the effluent from the second stage granular media filter cells, filtration may be turned off during washing and wash water used for washing the granular media can be replaced with suitably clean water. This can be done from an external source, such as through a pipe 52. Alternatively, the wash water can be replaced with effluent from another filter cell being in filtering mode. This could be accomplished using a tube 53 connecting the effluent volumes of the cells between two adjacent filter cells, or with the use of pump means 54a, b. The tube is preferably provided with controlled valve means 55.

The reason for this arrangement is to prevent that particles that have been captured in the granular filter media bed are dislodged by the movement of the media particles during the washing and escape into the effluent. Even if the effect is small there is an obvious need to eliminate it when producing an extremely clean effluent.

For sake of clarity of FIGS. 4a, b and c a tube 53 is shown only between the adjacent cells 46b and 46c and pump means 54a, b only between the adjacent cells 46a and 46b. The means chosen for the communication between cells is preferably mounted between all adjacent cells working in parallel. Further, reject pipes have been left out in FIG. 4a. In FIGS. 4b, c is schematically shown reject pipes 56 and 57 from the first stage granular media filter modules and second stage granular media filter modules, respectively. The reject pipe in each cell is connected to all filter modules in the cell, which is illustrated with pipes 57a, 57b in FIG. 4c. As discussed above, the reject pipes 56, 57 are provided with valve means 58, 59, which are controlled from a control unit, which however is not illustrated in the FIGS. for the sake of clarity.

Consequently, depending on the circumstances, the filtration may continue during the washing, or it can be stopped, that is, in that case both the filtration and the washing are performed intermittently.

In the embodiment illustrated in FIGS. 4a-c, the plant is laid out for continuous filtration and continuous washing in the first stage granular media filters. However, it is also possible to operate said first stage granular media filters with continuous filtration and intermittent washing, and with intermittent filtration, i.e. stopping the filtration during the intermittent washing. In this last case, the same methods and type of means would be used as in the corresponding case for the second stage granular media filters, using controlled valve means 60 in a reject pipe 61, as schematically illustrated in FIG. 1. Replacement water can be supplied in the form of effluent from parallel filters being in filtration mode, from second stage filters or from an external source.

The present invention is not limited to the systems described above but is suitable to use in applications of all kinds where a high purity liquid is to be produced by filtration.

What is claimed is:

1. A method for the treatment of water or wastewater, having impurities therein, by filtration through two moving bed granular media filter stages disposed in series, comprising:

feeding of said water/wastewater as a first influent through first feed pipes to first stage granular media filters comprising granular filter media, wherein said first influent is filtered in said first stage granular media filters to produce a first effluent;

feeding said first effluent as a second influent through second feed pipes to second stage granular media filters comprising granular filter media, wherein said second feed pipes are provided with first valves to allow or prevent the feeding of said second influent to said second stage granular media filters and wherein said second influent is filtered in said second stage granular media filters to produce a second effluent, wherein the method includes intermittent washing of the granular filter media of said second stage granular media filters by discontinuing the feeding of said first effluent as a second influent through said second feed pipes to said second stage granular media filters, and instead feeding wash water to said second stage granular media filters to wash the granular filter media of said second stage granular media filters, wherein the second stage granular media filters are operated, using said first valves, such that the feeding of said first effluent as second influent to said second stage granular media filters is discontinued during said intermittent washing, and wherein said wash water for washing of the granular filter media of the second stage granular media filters consists of water produced as second effluent from another second stage granular media filter.

2. The method according to claim 1, wherein the first stage granular media filters are operated with continuous filtration and continuous granular media washing.

3. The method according to claim 1, wherein the first stage granular media filters are operated with continuous filtration but with intermittent granular media washing.

4. The method according to claim 1, wherein the first stage granular media filters are operated with intermittent filtration and intermittent washing and that water used for washing of the filter media is replaced with suitably clean water.

5. The method according to claim 4, wherein the replacement water consists of water produced as first and/or second effluent.

6. The method according to claim 1, wherein the granular filter media in said granular media filters is washed by removing granular filter media from the bottom part of the filter bed, transporting it to a media washer, washing it and returning it to the top of the granular filter media bed, while a reject consisting of wash water containing pollutants is produced.

7. The method according to claim 6, wherein said granular filter media is transported from the bottom part of the filter bed with an air lift pump to a media washer, washed filter media is returned to the top of the granular filter media bed and said reject is discharged through a reject pipe.

8. The method according to claim 7, wherein a valve means in the reject pipe is kept open only during the washing of filter media.

9. The method according to claim 8, wherein a continuous fractional flow of water through the reject pipe is maintained between washings.

10. The method according to claim 7, wherein a valve means in the reject pipe is opened a suitable time before starting the air lift pump and is closed at a suitable time after the air lift pump is stopped.

11. A plant for the treatment of water or wastewater, having impurities therein, for performing a method according to claim 1, comprising at least two first stage free-standing moving bed granular media filter modules comprising granular filter media or at least two filter cells comprising at least one first stage granular moving bed media filter modules comprising granular filter media and at least two second stage free-standing granular moving bed media filter modules comprising granular filter media or at least two filter cells comprising at least one second stage granular moving bed media filter module comprising granular filter media, disposed in series, such that the effluent from the first stage granular moving bed media filter modules or filter cells is the influent of the second stage granular moving bed media filter modules or filter cells, wherein the second stage granular moving bed media filter modules are intermittently washed with wash water and are provided with controlled valve means for stopping reject flow between washings, wherein the second stage granular moving bed media filters are operated with intermittent filtration, wherein, in the second stage granular media filters, the feeding of said first effluent as second influent is discontinued during washing, and wherein the second stage granular moving bed media filter comprises an inlet pipe or tube for inlet of said wash water, consisting of water produced as second effluent from another second stage granular moving bed media filter module to replace the water used for washing of the granular filter media of the second stage granular media filter.

12. A plant according to claim 11, wherein the first stage granular moving bed media filter modules are arranged to be intermittently washed and are provided with controlled valve means for stopping reject flow between washings.

13. The plant according to claim 11, wherein the valve means comprises a by-pass arrangement which admits a continuous fractional flow of water between washings.

* * * * *